J. DAIN.
HAY LOADER.
APPLICATION FILED APR. 11, 1908. RENEWED NOV. 27, 1916.

1,270,123.

Patented June 18, 1918.
3 SHEETS—SHEET 1.

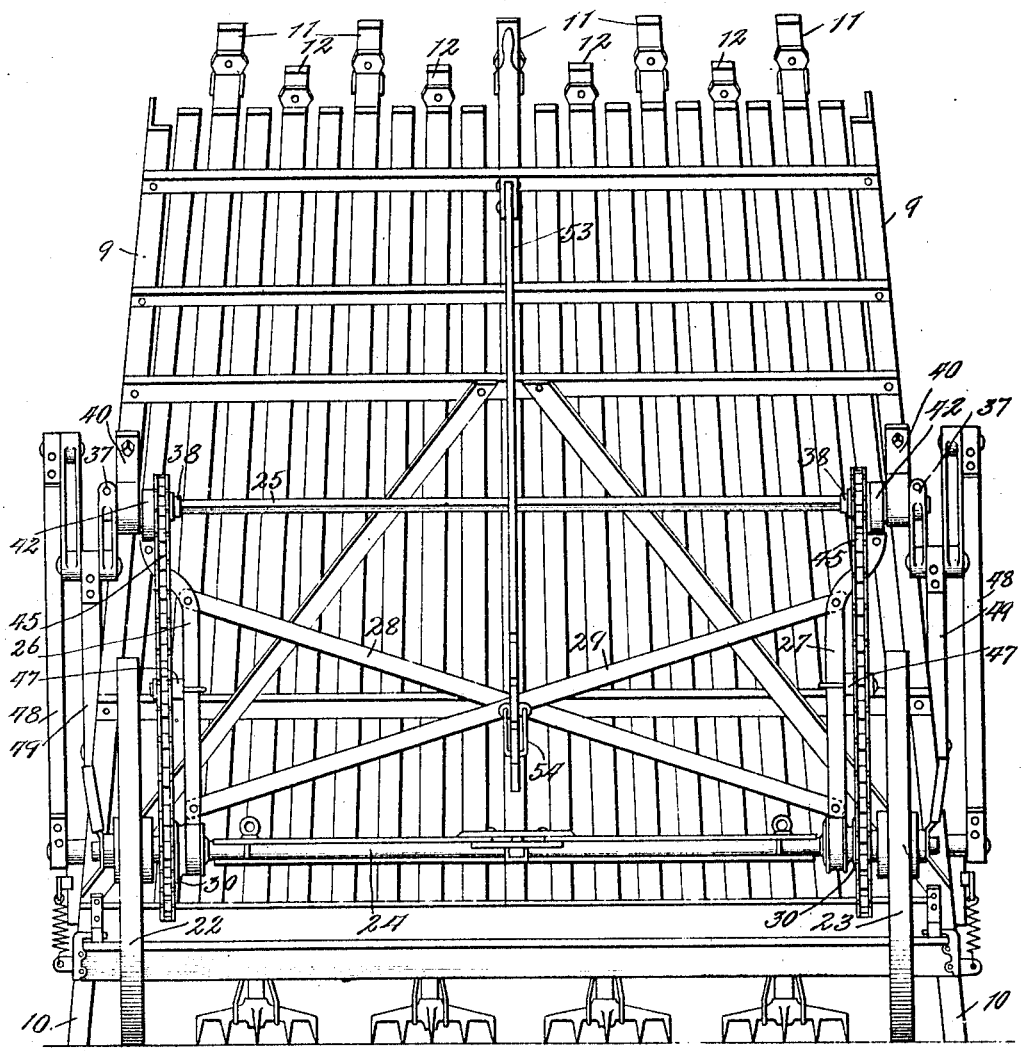

J. DAIN.
HAY LOADER.
APPLICATION FILED APR. 11, 1908. RENEWED NOV. 27, 1916.
1,270,123.
Patented June 18, 1918.
3 SHEETS—SHEET 3.
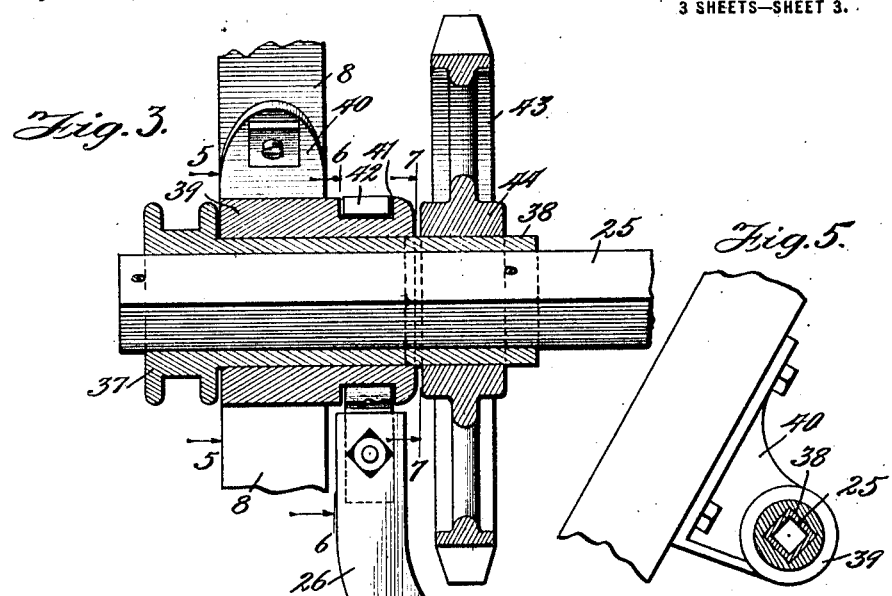
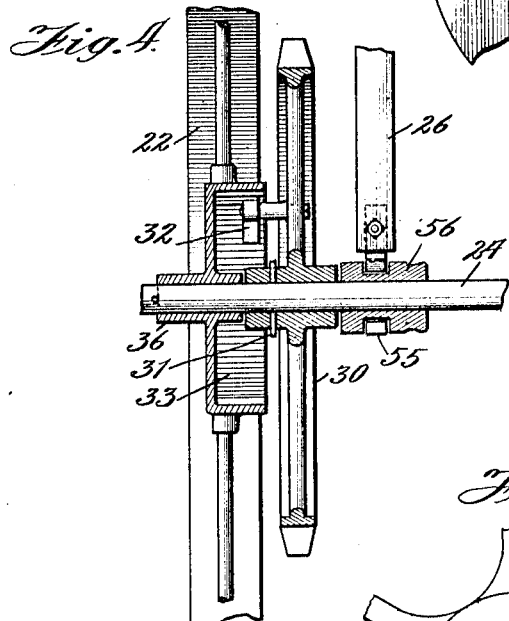
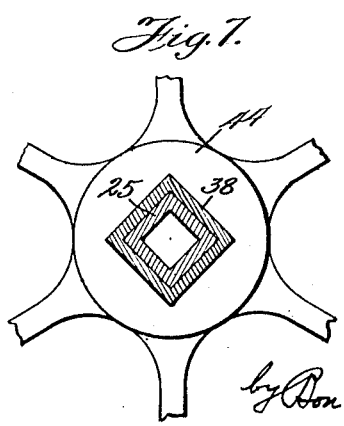

UNITED STATES PATENT OFFICE.

JOSEPH DAIN, OF OTTUMWA, IOWA, ASSIGNOR TO DAIN MANUFACTURING COMPANY OF IOWA, OF OTTUMWA, IOWA.

HAY-LOADER.

1,270,123.     Specification of Letters Patent.     Patented June 18, 1918.

Application filed April 11, 1908, Serial No. 426,559. Renewed November 27, 1916. Serial No. 133,817.

*To all whom it may concern:*

Be it known that I, JOSEPH DAIN, a citizen of the United States, residing at Ottumwa, in the county of Wapello and State of Iowa, have invented certain new and useful Improvements in Hay-Loaders, of which the following is a specification, reference being had to the accompanying drawings.

My invention relates to hay-loaders, and particularly to loaders of the type shown and described in my Patent No. 961,757, dated June 21, 1910. In such loaders the hay is carried up by a series of reciprocating rakes over an elevator frame and discharged at the upper end of said frame. The elevator frame is supported in an inclined position by means of a wheeled frame or carriage, its lower end resting on the ground. The wheeled frame is in the form of an upright frame supported by two wheels,—the upper portion of the elevator frame being pivotally connected with the upper portion of the wheeled frame and the lower portion of the elevator frame being connected with the axle of the wheeled frame by suitable braces which are adjustable to vary the inclination of the elevator frame. The raking devices are driven by means of a crank shaft carried by the wheeled frame and operated by forward movement of the machine, the crank shaft being connected with the raking devices by pitmen fulcrumed on the elevator frame and connected at their rear ends with the raking devices. The raking devices are composed of longitudinally-extending rake-bars having suitable teeth, the bars being connected together to form two rake-frames which move simultaneously in opposite directions. The crank shaft is provided with two cranks at each end, and there are two pitmen at each side of the machine.

The improvements with which my present application has to do relate particularly to the construction of the wheeled frame, the construction and arrangement of the cranks and connected parts, and the mechanism for operating the cranks from the wheels. The specific features of improvement are hereinafter described and pointed out in the claims.

In the accompanying drawings,—

Fig. 2 is a front view thereof;

Fig. 3 is an enlarged detail, being a longitudinal sectional view of one end of the synchronizing shaft and parts mounted thereon;

Fig. 4 is a longitudinal sectional view of one end of the axle and parts mounted thereon;

Fig. 5 is a section on line 5—5 of Fig. 3;

Fig. 6 is a section on line 6—6 of Fig. 3; and

Fig. 7 is a section on line 7—7 of Fig. 3.

Referring to the drawings,—

Figure 1:
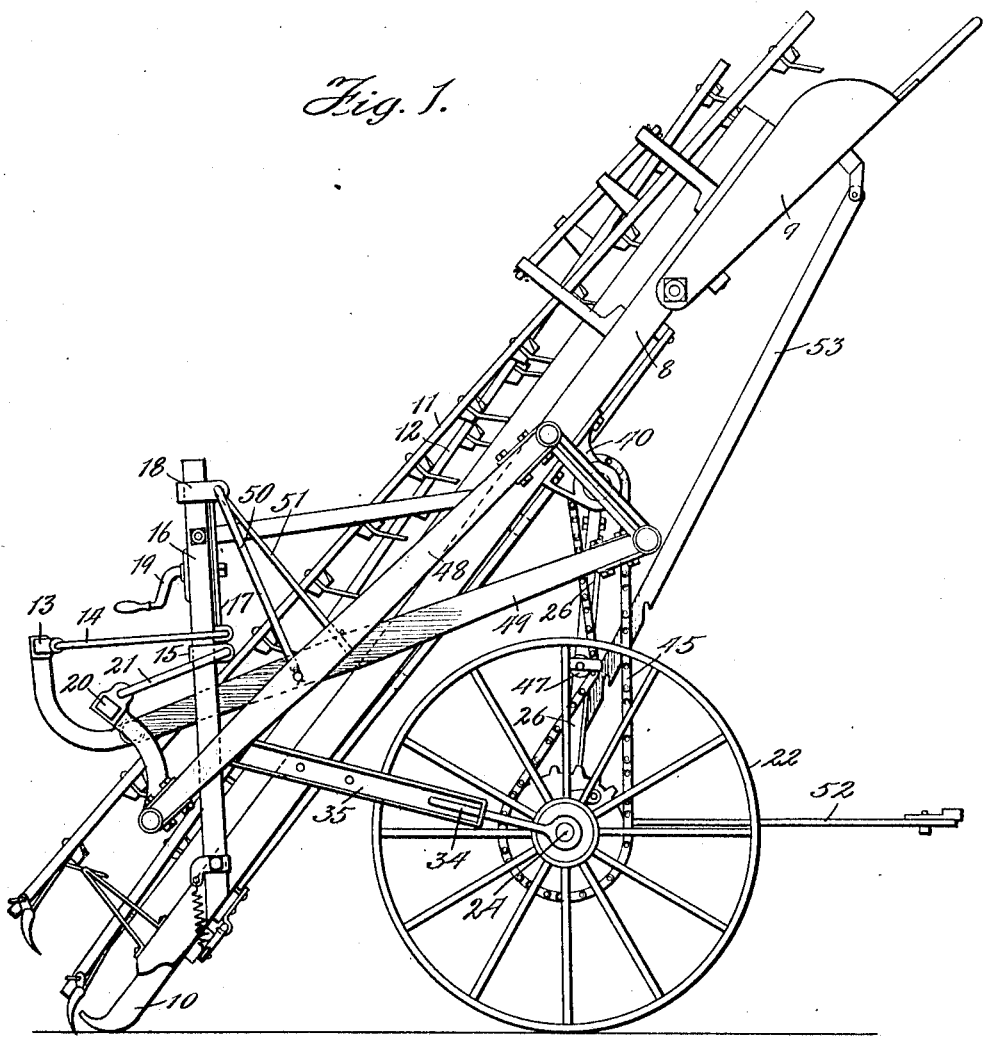
Figure 1 is a side view of my improved loader.

8 indicates the elevator frame of the loader, which is of the usual construction being preferably provided with a pivoted extension 9 at its upper end, as shown in Fig. 1. The lower end of the loader rests on the ground, being preferably provided with shoes 10 also shown in Fig. 1. 11—12 indicate the rake-frames, which are adapted to be reciprocated over the elevator frame in the manner well known to those familiar with the art. As best shown in Fig. 1. the rake-bars composing the rake-frames 11 are connected by a cross-bar 13, the ends of which are connected by links 14 with slides 15 mounted upon uprights 16 carried by the elevator frame. Said slides are connected by connecting-rods 17 with slides 18 also mounted on the uprights 16. The slides 15—18 are adjustable vertically of the standards 16 by cranks 19, as described in my application hereinbefore referred to. The rake-bars composing the frame 12 are in like manner connected at their lower end with a cross-bar 20 which is connected by links 21 with the slides 15. Thus the rake frames may be adjusted to vary the distance between their rake-teeth and the elevator frame. These parts have nothing to do with my present invention.

The wheel frame or carriage is composed principally of carrying wheels 22—23 mounted on an axle 24; upright bars or standards 26—27 which rise from the outer portions of the axle 24 and serve to pivotally support the elevator frame between its ends, said standards being connected by diagonal braces 28—29 which extend from the upper portion of each bar or standard 26—27 to the lower portion of the other standard, as shown in Fig. 2; and suitable driving mechanism hereinafter described which is actuated by the carrying wheels and serves to operate the cranks hereinafter described by which the usual rake frames are actuated. A synchronizing shaft 25 extends from the standard 26 at one side to the standard 27 at the other side of the machine and operates to make the cranks at opposite sides of the machine rotate in unison.

As shown in Fig. 4, the wheel 22 is loosely mounted on the axle 24 and the wheel 23 is similarly mounted at the other end of the axle. Each wheel 22—23 when rotated in a forward direction operates to drive a sprocket-wheel 30 mounted on the axle 24 adjacent thereto and connected with the axle by a pin 31, or other suitable means, so that it will rotate therewith,—the rotation of said sprocket-wheels being accomplished by means of pawls 32 carried by the sprocket-wheels and engaging internal ratchet-wheels 33 arranged around the hubs of the wheels 22—23, as best shown in Fig. 4. The purpose of this arrangement is to cause the carrying-wheels to rotate the sprocket-wheels 30 only when said carrying-wheels rotate in a forward direction. As best shown in Fig. 2, the sprocket-wheels 30 are placed on the axle 24 between the carrying-wheels, and the outer ends of the axles are connected to the elevator frame by connections comprising rods 34 and perforated bars 35, best shown in Fig. 1. The rods 34 are preferably mounted on the outer ends of the hubs 36 of the carrying-wheels.

As best shown in Figs. 2 and 3 the synchronizing shaft 25 is square in cross-section and is also tubular, as shown in Fig. 5. At its outer ends it carries or is connected with double cranks 37 each of which is provided with a sleeve 38 which is internally square in cross-section and fits upon the crank shaft so as to rotate therewith. The sleeves 38 are externally rounded intermediately, as shown in Fig. 6, for the purpose of forming journals which fit in suitable bearings formed by collars 39 which are carried by brackets 40 secured to the elevator frame, as shown in Figs. 1 and 3. The cranks are thus securely connected with the elevator frame but are nevertheless permitted to rotate freely. The shaft 25, the ends of which are fitted in the sleeves 38, serves to synchronize the two cranks so that they rotate in unison.

As best shown in Fig. 3, the collars 39 extend inward beyond the side bars of the elevator frame 8 and are each provided with a groove 41 which receives a split coupling 42 which connects the upper end of the supporting bar 26 or 27, as the case may be, with said collar. The grooves 41 are circular so that the couplings 42 may turn therein to compensate for the adjustment of the position of the elevator frame relatively to the axle. A similar split coupling 55 is provided at the lower end of each of the supporting bars 26—27 and in like manner is connected with a grooved sleeve 56 mounted on the axle 24, as best shown in Fig. 4.

43 indicates sprocket-wheels which coöperate with the sprocket-wheels 30 and are mounted on the inner ends of the sleeves 38 which are part of the cranks 37, as best shown in Fig. 3, the sprocket-wheels 43 being in line with the sprocket-wheels 30, as shown in Fig. 2. Each of the sprocket-wheels 43 is provided with an internally-squared hub 44 which fit upon the externally-squared inner ends of the sleeves 38, as shown in Figs. 3 and 7, so that the sprocket-wheels 43 are caused to rotate with the cranks 37, and as the shaft 25 is also squared and fits within the sleeves 38 both cranks are caused to rotate in unison.

45 indicates link belts, which connect the sprocket-wheels 38 and 43 at each side of the machine so that power is applied directly to the cranks at both sides of the machine to drive the pitmen. It will be evident from the foregoing description that forward rotation of either of the carrying-wheels will operate to rotate the cranks and drive the pitmen at both sides of the machine.

As best shown in Fig. 2, the supporting bars 26—27 are deflected so as to extend through the chains 45, and support the cranks between the sprocket-wheels 43 and the collars 39,—their lower ends being connected with the axle inside the lower sprocket-wheels so as not to interfere with the ratchet connections between the lower sprocket-wheels and the hubs of the carrying-wheels. By thus supporting the cranks the strain is better equalized and more efficient support for the cranks secured.

47 indicates belt tighteners which are adjustably mounted on the uprights 26—27, as shown in Fig. 2, and bear against the chains 45 so as to regulate the tension of such chains, as best shown in Fig. 1. By moving the belt tighteners 47 vertically on the uprights 26—27 obviously the chains may be deflected more or less and their tension accordingly varied.

48—49 indicate pitmen which connect the cranks with the rake frames, said pitmen being fulcrumed, respectively, on swinging rods 50—51 connected with the slides 18, as shown in Fig. 1. This construction is fully shown and described in my patent above referred to.

52 indicates the usual draft-devices, which are connected with the axle 24, and 53 indicates a bar which supports the hinged extension 9, the lower end of said bar being supported by a swinging link 54 secured to the crossed bars 28—29, as shown in Fig. 2.

From the foregoing description it will be seen that although I provide a synchronizing shaft there is no appreciable strain on said shaft during the ordinary operation of the machine as the sprocket wheels 43, although, in a broad sense carried by the shaft 25, are mounted upon the inner ends of the sleeves 38, and therefore the driving strain is transmitted directly to the cranks through said sleeves and does not come upon the shaft 25, which is employed simply to synchronize the cranks at the opposite sides of the machine.

By journaling the supporting bars 26—27 at their upper ends, as described, the wheels are permitted to be adjusted toward or from the elevator frame, and by journaling them at their lower ends they do not interfere with the vertical swinging of the draft devices.

That which I claim as my invention, and desire to secure by Letters Patent, is,—

1. A hay-loader, comprising a wheel frame, standards rising from the opposite end portions thereof, brackets supported by the upper end portions of said standards, an elevator-frame to which said brackets are connected, cranks at opposite sides of the elevator-frame having sleeves journaled in said brackets and extending inwardly beyond said standards, sprocket-wheels mounted on said sleeves between and adjacent to said standards, and chains actuated by the forward movement of the loader and operating over said sprocket-wheels for rotating the cranks.

2. A hay-loader, comprising a wheel frame, standards rising from the opposite end portions thereof, brackets supported by the upper end portions of said standards, an elevator-frame to which said brackets are connected, cranks at opposite sides of the elevator-frame having sleeves journaled in said brackets and extending inwardly beyond said standards, sprocket-wheels mounted on said sleeves between and adjacent to said standards, chains actuated by the forward movement of the loader and operating over said sprocket-wheels for rotating said cranks, and a synchronizing shaft connecting said sleeves so that they rotate in unison.

3. In a hay-loader, the combination of wheeled supports comprising carrying-wheels, an axle, uprights journaled on the axle between the carrying-wheels, braces connecting said uprights, a shaft supported at its outer ends, sprocket-wheels mounted on said axle between said uprights and the adjacent carrying-wheels, means operated by forward movement of the carrying-wheels, for driving said sprocket-wheels, sprocket-wheels mounted on the shaft, and chains connecting the sprocket-wheels on the shaft with those on the axle.

4. In a hay-loader, the combination of carrying-wheels, an elevator frame, a shaft non-circular in cross-section, cranks connected with the end portions of said shaft, said cranks having sleeves adapted to fit upon and conform to the end portions of said shaft, said sleeves having a portion externally non-circular in cross-section, sprocket-wheels mounted on the non-circular portion of said sleeves, sprocket-wheels driven by the carrying-wheels, and chains connecting the latter sprocket-wheels with said first-mentioned sprocket-wheels.

5. In a hay-loader, the combination of carrying-wheels, an elevator frame, a shaft non-circular in cross-section, cranks connected with the end portions of said shaft, said cranks having sleeves adapted to fit upon and conform to the end portions of said shaft, said sleeves having a portion externally non-circular in cross-section and a portion circular in cross-section, sprocket-wheels mounted on the non-circular portions of said sleeves, sprocket-wheels driven by the carrying-wheels, chains connecting the latter sprocket-wheels with said first-mentioned sprocket-wheels, and bearings engaging said circular portions of said sleeves.

6. In a hay-loader, the combination of an elevator frame and brackets carried thereby, said brackets having collars, a square shaft, cranks for the end portions thereof, said cranks having sleeves fitted upon and conforming to said shaft and having externally circular and square portions, sprocket-wheels mounted on the squared portions of said sleeves, said collars forming bearings for said circular portions, carrying-wheels, sprocket-wheels connected with said carrying-wheels, means supporting the shaft from said carrying-wheels, and drive chains coöperating with said sprocket-wheels to rotate the shaft.

7. In a hay-loader, the combination of an elevator frame and brackets carried thereby, said brackets having collars, a square shaft, cranks for the end portions thereof, said cranks having sleeves fitted upon and conforming to said shaft and having externally circular and square portions, sprocket-wheels mounted on the squared portions of said sleeves, said collars forming bearings for said circular portions, carrying-wheels, sprocket-wheels connected with said carrying-wheels, an axle, uprights supported by the axle and having bearings on said sleeves, and drive-chains coöperating with said sprocket-wheels to rotate the shaft.

8. In a hay-loader, the combination of an elevator frame and brackets carried thereby, said brackets having collars, a square shaft, cranks for the end portions thereof, said cranks having sleeves fitted upon and conforming to said shaft and having externally circular and square portions, sprocket-wheels mounted on the squared portions of said sleeves, said collars forming bearings for said circular portions, carrying-wheels, sprocket wheels connected with said carrying-wheels, an axle, uprights supported by the axle and having bearings in grooves formed on said sleeves, and drive-chains coöperating with said sprocket-wheels to rotate the shaft.

9. In a hay-loader, the combination of a wheel-frame, an elevator-frame supported intermediately thereby, hay elevating means coöperating with said elevator frame, bearings underneath and at opposite sides of the elevator frame, means carried by the wheel-frame for supporting said elevator-frame and bearings, cranks having journals fitted in said bearings, sprocket-wheels at opposite sides of the machine between said bearings and mounted on said journals to rotate therewith, sprocket-wheels carried by the wheel-frame at opposite sides of the machine, and rotated by the forward movement of the loader, and chains at opposite sides of the machine respectively connecting the latter sprocket-wheels with the sprocket-wheels carried by the journals.

10. In a hay-loader, the combination of a wheel-frame, an elevator-frame supported intermediately thereby, hay elevating means coöperating with said elevator frame, bearings underneath and at opposite sides of the elevator frame, means carried by the wheel-frame for supporting said elevator-frame and bearings, cranks having journals fitted in said bearings, sprocket-wheels at opposite sides of the machine between said bearings and mounted on said journals to rotate therewith, sprocket-wheels carried by the wheel-frame at opposite sides of the machine, and rotated by the forward movement of the loader, chains at opposite sides of the machine respectively connecting the latter sprocket-wheels with the sprocket-wheels carried by the journals, and means connecting the journals at opposite sides of the machine so that they rotate in unison.

11. In a hay-loader, the combination of a wheel-frame, an elevator-frame supported intermediately thereby, hay elevating means coöperating with said elevator frame, bearings underneath and at opposite sides of the elevator frame, means carried by the wheel-frame for supporting said elevator-frame and bearings, cranks having journals fitted in said bearings, sprocket-wheels at opposite sides of the machine between said bearings and mounted on said journals to rotate therewith, sprocket-wheels carried by the wheel-frame at opposite sides of the machine, and rotated by the forward movement of the loader, chains at opposite sides of the machine respectively connecting the latter sprocket-wheels with the sprocket-wheels carried by the journals, and a synchronizing shaft connecting the journals at opposite sides of the machine so that they rotate in unison.

12. In a hay-loader, the combination of a wheel-frame, an elevator-frame supported intermediately thereby, hay elevating means coöperating with said elevator frame, bearings underneath and at opposite sides of the elevator frame, means carried by the wheel-frame for supporting said elevator-frame and bearings, cranks having journals fitted in said bearings, sprocket-wheels at opposite sides of the machine between said bearings and mounted on said journals to rotate therewith, sprocket-wheels carried by the wheel-frame at opposite sides of the machine, and rotated by the forward movement of the loader, chains at opposite sides of the machine respectively connecting the latter sprocket-wheels with the sprocket-wheels carried by the journals, and a synchronizing shaft extending through said journals and connecting the same so that they rotate in unison.

13. In a hay-loader, the combination of an elevator-frame having bearings at opposite sides thereof, cranks having sleeves journaled in said bearings, sprocket-wheels mounted on said sleeves, a shaft connecting said sleeves so that they rotate in unison, a wheel-frame, sprocket-wheels carried by said wheel-frame, and chains connecting the latter sprocket-wheels with said first-mentioned sprocket-wheels.

JOSEPH DAIN.

Witnesses:
C. A. LASSER,
W. G. DUFFIELD.